Patented Aug. 8, 1950

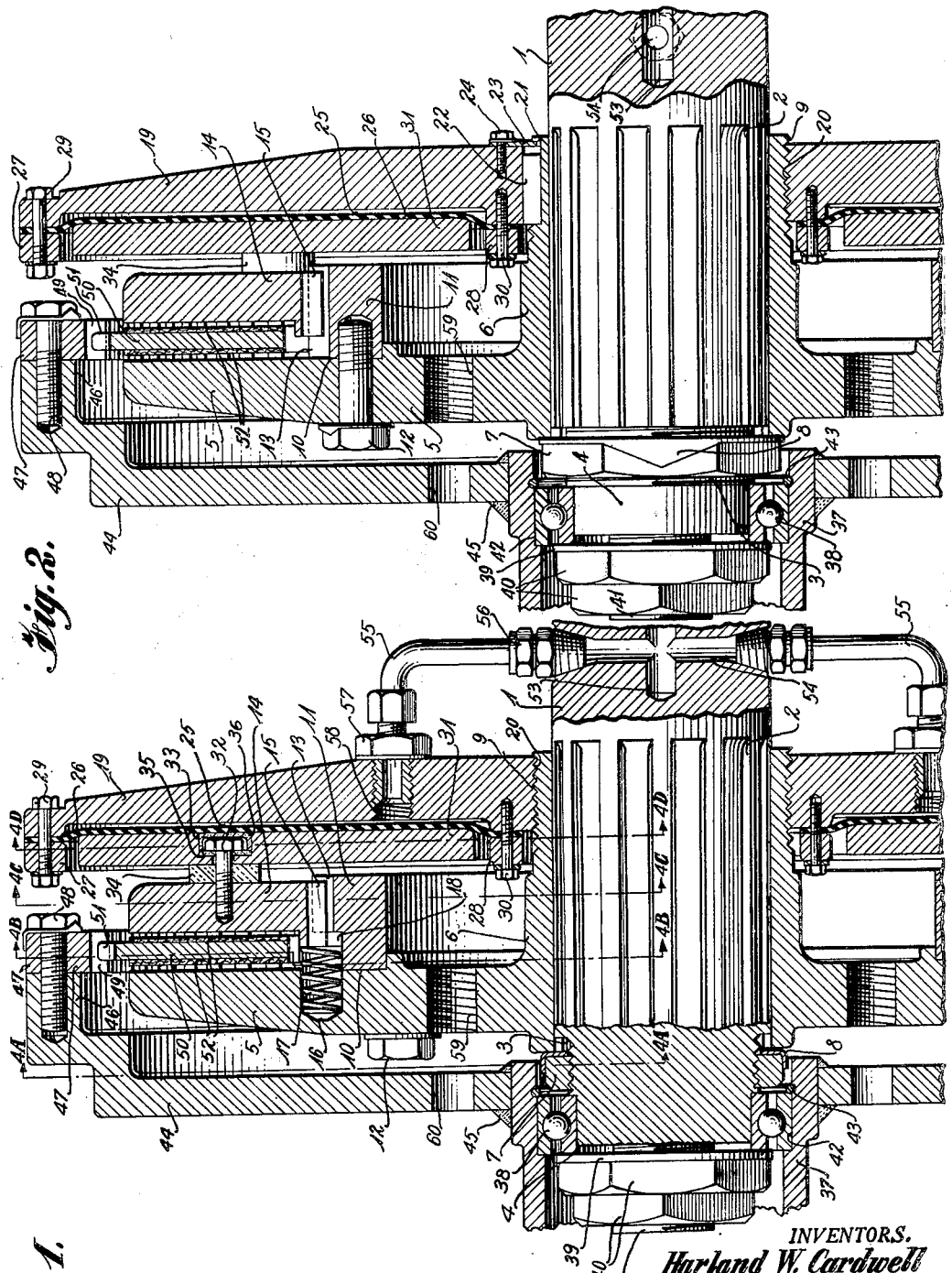

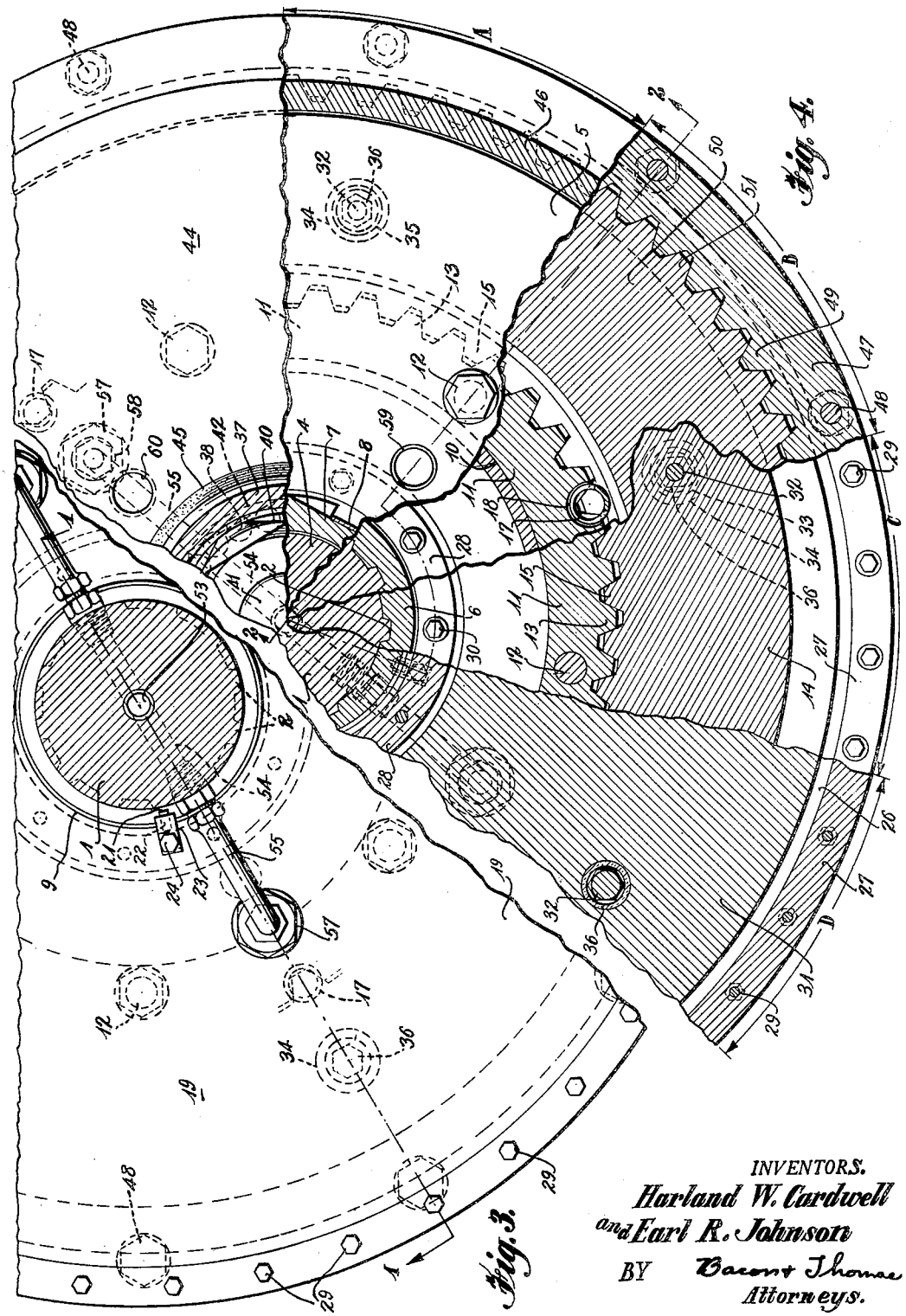

2,517,972

UNITED STATES PATENT OFFICE 2,517,972

AIR-COOLED FRICTION CLUTCH

Harland W. Cardwell and Earl R. Johnson, Wichita, Kans., assignors to Cardwell Manufacturing Company, Inc., Wichita, Kans.

Application November 20, 1946, Serial No. 711,174

3 Claims. (Cl. 192—88)

This invention relates to clutches and particularly clutches of the type wherein fluid pressure is employed to engage and spring pressure is employed to disengage the working parts thereof. In clutches of this type, considerable heat is generated between the friction elements during engagement and disengagement thereof with each other and during periods of overload when slippage between the parts occurs.

It is an object of this invention to provide such a clutch wherein means are provided to prevent transfer of the generated heat to other parts of the mechanism particularly to the diaphragm which is responsive to pressure of the operating fluid.

Another object of this invention is to provide such a clutch wherein a relatively low unit pressure in the fluid medium is transmitted as a high unit pressure between the friction elements of the clutch.

A still further object of this invention is to provide a clutch of this type in which a toothed driving member is so arranged that a minimum of force is transmitted through the teeth thereof.

Other objects and advantages will appear to those skilled in the art as the description of the device proceeds.

In the drawings:

Figure 1 is an axial sectional view of a clutch embodying the principles of this invention taken on the line 1—1 of Figure 3;

Figure 2 is a sectional view similar to Figure 1 but taken on the line 2—2 of Figure 4;

Figure 3 is an elevational view of a portion of the clutch when viewed from the right of Figure 1; and Figure 4 is a composite sectional view, the sectors identified as a, b, c, and d being portions of sectional views taken on lines 4a—4a, 4b—4b, 4c—4c and 4d—4d, respectively, of Figure 1.

In the illustrated embodiment of this invention, a drive shaft 1 is provided with longitudinal splines 2 adjacent one end thereof and a reduced threaded portion 3 adjacent said splines and a further reduced cylindrical portion 4 adjacent said reduced threaded portion. A disc-like backing plate 5 having a central hub portion 6, provided on its inner surface with splines complementary to those on the driving shaft, is carried by said driving shaft. The hub portion 6 is held in operative position on the drive shaft 1 by means of a threaded nut 7 engaging the threads of the reduced threaded portion 3 of said shaft, and a lock washer 8 is provided to prevent inadvertent loosening of the nut 7. The outer portion of the hub 6 is provided with screw threads 9 extending inwardly from the end of the hub opposite the backing plate 5. The backing plate 5 is provided on its inner face with an annular groove 10 in which is positioned a portion of an annular drive ring 11. This drive ring is held against the backing plate 5 by means of cap screws 12 extending through the backing plate and threaded into the drive ring, as clearly shown in Figure 2.

The drive ring 11 is provided on its outer peripheral surface with tooth elements 13 extending parallel to the axis of the drive shaft 1. A pressure plate 14, in the form of an annular member having tooth elements 15 at its inner peripheral surface, complementary to and meshing with the tooth elements 13 on the drive ring 11, is carried by the drive ring 11 for sliding movement longitudinally of the drive shaft 1, but is held by the meshing tooth elements 13—15 against rotation relative to the backing plate 5 and drive ring 11. The backing plate 5 is further provided with a series of angularly spaced openings or holes 16 in which are located compression springs 17 bearing at one end against the bottom of the opening and at the other end against the pressure plate 14 on the end faces of certain of the tooth elements 15 thereof, whereby the springs 17 tend to urge the pressure plate 14 axially of the drive shaft 1, and in a direction away from the backing plate 5. Notched portions 18 are provided in the drive ring 11 in alignment with the openings 16 to accommodate the ends of the springs 17 as they move the pressure plate away from backing plate 5. With the arrangement just described, it is apparent that tooth elements 13 and 15 are located as far from the axis of the drive shaft 1 as are the springs 17, resulting in less force being transmitted through the teeth at that radius than would be transmitted if the teeth were located radially inwardly of the springs 17.

A disc 19, provided with a central threaded opening 20, is threaded onto the external threads 9 of the hub portion 6 of the clutch to a position spaced a predetermined distance from the adjacent end face of drive ring 11 and pressure plate 14. A keyway 21 is jointly provided in the hub portion 6 and disc 19 to accommodate a key 22, which is inserted after the disc 19 is in position and prevents unscrewing of the disc 19 from the hub portion 6 during operation of the clutch. The key 22 is locked in position by means of a retaining plate 23 held in place over the end of the key 22 by a cap screw 24. By removing the retaining plate 23 and the key 22, it is possible to adjust the disc 19 axially of the hub to compensate for wear of the friction faces of the clutch plate 50.

The face of the disc 19 nearest the backing plate 5 is provided with an annular depression 25 extending concentrically about the axis of shaft 1. A flexible diaphragm 26, in the form of an annular disc, overlies the annular depression 25 to provide therein an expansible pressure chamber. The diaphragm 26 may be constructed of any suitable, flexible material impervious to air, such as rubber, or the like. The diaphragm 26 is held in sealed engagement with the face of disc 19 by means of a pair of annular clamp rings 27 and 28. Bolt assemblies 29 extending through ring 27, diaphragm 26 and disc 19 hold the outer peripheral portion of the diaphragm in sealed engagement with the disc 19. Similarly, cap screws 30 clamp the inner portion of the diaphragm 26 and ring 28 against disc 19, thus converting the depression 25 into an air-tight, annular expansible pressure chamber. A pressure applying plate 31, in the form of an annular disc, is attached to the pressure plate 14 by means of cap screws 32. These cap screws are provided with heads lying in recesses 33 extending inwardly from the diaphragm-engaging face of the pressure applying plate 31. Spacing washers or blocks 34 are provided between the pressure applying plate 31 and the pressure plate 14 to hold them spaced apart a fixed distance to provide a permanent air space between the plates 14 and 31 and to act as movement transmitting means therebetween. The blocks 34 are made of heat insulating material of any conventional or suitable type and function to prevent the transfer of the frictionally generated heat from the pressure plate 14 to the diaphragm 26. Further insulation is accomplished by means of a heat insulating washer 35 under the head of the cap screw 32 and a heat insulating cap 36 covering the head of the cap screw 32; the shank of the cap screw 32 being spaced from the plate 31 through a clearance space sufficient to prevent any heat transfer from said shank to said plate by conduction. It will be seen that by this arrangement, the transfer of frictionally generated heat from the pressure plate 14 to the diaphragm 26 is effectively prevented. The parts described are preferably so proportioned that the face of the pressure applying plate 31 nearest the diaphragm 26 is always in engagement therewith and is held in such engagement by the springs 17 acting through the plate 14 and spacing blocks or washers 34.

A driven shaft in the form of a tubular member 37 extends coaxial to the drive shaft 1 and is supported for rotation relative to the drive shaft 1 by ball bearing assembly 38, the inner race of said bearing being seated on the reduced cylindrical portion 4 of the drive shaft 1 and being held thereon by a washer 39 and lock nuts 40 engaging a threaded stem 41 extending from the end of the drive shaft 1. The outer race of the ball bearing 38 is seated in a counterbore 42 of the driven member 37 and is held therein by a retaining ring 43. A driven disc 44 is permanently attached to the driven shaft 37, as by welding at 45 or in any other suitable manner. The disc 44 is provided with an annular flange 46 extending around and outwardly of the backing plate 5 and toward the disc 19. The edge of the flange 46 nearest the disc 19 supports a driven element 47, which is attached thereto by means of cap screws 48. The element 47 is in the form of an annulus provided at its inner periphery with inwardly extending teeth 49. A clutch plate 50, also in the form of an annulus is provided at its outer edge with teeth 51 complementary to and engaging the teeth 49 of the element 47. The pitch diameter of the teeth 51 and that of gear 47 are equal, whereby clutch plate 50 is not capable of any substantial radial movement relative to the element 47, but is capable of longitudinal sliding movement relative thereto in a direction parallel to the axis of shafts 1 and 37. It will be seen that due to the inter-engagement of teeth 49 and 59, the plate 50 is freely shiftable longitudinally of the shaft but is held against rotation relative to the element 47 and the member 44. The clutch plate 50 is provided on opposite faces thereof with friction material 52 held thereon in any conventional or suitable manner.

A source of fluid pressure, such, for instance, as compressed air (not shown), is connected to the drive shaft 1 in such a manner as to supply fluid under pressure to an axial bore 53 in the drive shaft 1. It is to be understood that although compressed air is preferred, other fluid mediums might be employed satisfactorily such as a hydraulic fluid. Radially extending openings 54 conduct the fluid under pressure from bore 53 to conduits 55 connected to the drive shaft 1 by fittings 56. The conduits 55 conduct the fluid under pressure from the drive shaft 1 through fittings 57 and bores 58 in the disc 19 to the expansible pressure chamber 25.

It will be apparent that upon actuation of a suitable valve or other fluid pressure control means (not shown) to introduce fluid under pressure into bore 53, such pressure will act to expand chamber 25 by flexing of the diaphragm 26 to urge the plate 31 and the pressure plate 14 to the left, as seen in Figures 1 and 2, against the resistance of the springs 17, to effect frictional engagement of the plate 14 with the friction material 52 on one side of the clutch plate 50 and to urge the plate 50 to the left to effect frictional engagement of the friction element 52 on the other side of the plate 50 with the backing plate 5, thus frictionally connecting drive shaft 1 and driven shaft 37. So long as sufficient pressure is maintained in chamber 25 the friction elements 52 of the clutch will be held in driving engagement with each of the plates 5 and 14 and driving torque from the shaft 1 will be transmitted through the splines 2 to the hub 6 and the plate 5, thence, through the drive ring 11 and the teeth 13 and 15 to the pressure plate 14, and by frictional engagement between plates 5 and 14 to the clutch plate 50 held therebetween. The clutch plate 50, through the teeth 51 and 49, will drive element 47, which is rigidly carried by the driven shaft 37. When fluid pressure is released from pressure chamber 25, the springs 17 will act to move the pressure plate 14 to the right, as seen in Figures 1 and 2, and through elements 34 and 31 the flexible diaphragm 26 will be collapsed, as shown in those figures, in which position the driving and driven elements of the clutch are disengaged.

It is to be noted that the radial extent of the pressure chamber 25 exceeds by a considerable amount the radial extent of the inter-engaging faces of the backing plate 5, the clutch plate 50, and the pressure plate 14. This is true since the pressure chamber 25 extends radially outward beyond the outermost portions of backing plate 5 and the pressure plate 14 and also extends radially inward beyond the innermost edge of the clutch plate 50. As a result of this construction a low unit pressure in the fluid medium in the pressure chamber 25 results in a rather large total pressure being exerted against the diaphragm 26. This rather large total pressure is transmitted to the pressure plate 14 where it is distributed over a much smaller area of contact between the pressure plate and the clutch plate 50, resulting in a relatively high unit pressure between the driving and driven members.

The backing plate 5 is provided with a plurality of threaded openings 59 to be engaged by a pulling instrument in the event it is desired to remove backing plate 5 and hub 6 from the spline shaft 1. The driven disc 44 is also provided with a plurality of openings 60 therethrough opposite the openings 59 of the plate 5. The openings 59 and 60 function, during operation of the clutch to admit air into the space between the plate 5 and the disc 19. The air thus admitted is carried by centrifugal force outwardly through the air space between the plate 14 and the plate 31, thus acting to dissipate frictionally generated heat from the pressure plate 14.

It is further contemplated that cap screw 32, employed to hold the pressure plate 14 and pressure applying plate 31 assembled, may be made entirely of heat insulating material to further accomplish the desired insulation. Such a cap screw could be employed with or without the heat insulating washer 35 and cap 36. Since the cap screw 32 does not carry any substantial load during the operation of the clutch, its construction of a heat insulating material is obviously quite feasible.

The above described arrangement is merely illustrative and it is to be understood that various changes may be made in the details of construction and in the arrangement of parts without departing from the invention as defined by the annexed claims.

We claim:

1. A clutch including a driving member and a driven member, one of said members being movable into frictional engagement with the other member, means providing an expansible pressure chamber having one wall thereof constituted by a flexible diaphragm, a pressure applying plate in engagement with said diaphragm, a recess in the face of said pressure applying plate adjacent said diaphragm, a spacing member extending from said pressure applying plate to said movable member and headed fastening means arranged with its head in said recess and extending from said recess, through said plate and spacing means to said movable member.

2. A clutch including a driving member and a driven member, one of said members being movable into frictional engagement with the other member, means providing an expansible pressure chamber having one wall thereof constituted by a flexible diaphragm, a pressure applying plate in engagement with said diaphragm, a recess in said pressure applying plate adjacent said diaphragm, a heat insulating spacing member extending from said pressure applying plate to said movable member, a headed fastening element having its head in said recess and extending through said pressure applying plate and through said heat insulating spacing member to said movable member, the head of said fastening element being enclosed by heat insulating material, whereby to prevent conduction of heat from said movable member to said pressure applying plate.

3. A clutch including a driving member and a driven member, one of said members being movable into frictional engagement with the other member, means providing an expansible pressure chamber having one wall thereof constituted by a flexible diaphragm, a pressure applying plate in engagement with said diaphragm, a recess in said pressure applying plate adjacent said diaphragm, a heat insulating spacing member extending from said pressure applying plate to said movable member, a headed cap screw having its head in said recess and extending through said pressure applying plate and through said heat insulating spacing member into threaded engagement with said movable member, a heat insulating washer between the head of said cap screw and the bottom of said recess, and a heat insulating cap member in said recess covering the remainder of said cap screw head.

HARLAND W. CARDWELL.
EARL R. JOHNSON.

REFERENCES CITED

The following references are of record in the file of this patent:

UNITED STATES PATENTS

| Number | Name | Date |
| --- | --- | --- |
| 2,017,715 | Goodyear et al. | Oct. 15, 1935 |
| 2,042,809 | Shelor | June 2, 1936 |
| 2,074,738 | Aikman | Mar. 23, 1937 |
| 2,321,565 | Wilson | June 15, 1943 |
| 2,330,856 | Adamson | Oct. 5, 1943 |
| 2,368,417 | Lambert | Jan. 30, 1945 |
| 2,370,360 | McLean et al. | Feb. 27, 1945 |
| 2,437,670 | Adamson | Mar. 16, 1948 |
| 2,462,944 | Cardwell et al. | Mar. 1, 1949 |
| 2,466,990 | Johnson et al. | Apr. 12, 1949 |
| 2,467,829 | Hornbostel | Apr. 19, 1949 |